(No Model.)

A. C. GRIGGS.
COUPLING FOR ELECTRIC CIRCUITS.

No. 399,326. Patented Mar. 12, 1889.

WITNESSES:
Henry Drury
David S. Williams

INVENTOR:
Albert C. Griggs
by his attorney
Francis T. Chambers

UNITED STATES PATENT OFFICE.

ALBERT C. GRIGGS, OF WILMINGTON, DELAWARE.

COUPLING FOR ELECTRIC CIRCUITS.

SPECIFICATION forming part of Letters Patent No. 399,326, dated March 12, 1889.

Application filed January 2, 1889. Serial No. 295,203. (No model.)

*To all whom it may concern:*

Be it known that I, ALBERT C. GRIGGS, of Wilmington, county of New Castle, State of Delaware, have invented a new and useful Coupling for Electric Circuits, of which the following is a true and exact description, reference being had to the accompanying drawings, which form a part of this specification.

My invention relates to couplings for two electric wires forming or adapted to form part of an electric circuit, and it is especially designed for use in a system of electric signaling from the cars of a railway-train to the engine—such, for instance, as is shown and described in my patent, No. 393,431, of November 27, 1888.

The objects which my coupling is devised to attain are, first, to enable the coupling of the wires of two cars to be easily, promptly, and securely made, and, second, to temporarily close the circuit in the act of coupling or uncoupling, so as to actuate the signal as each car is joined or parted from another, thus insuring the proper union of the wires in the train and their working condition and giving notice if they get out of order.

The novel features of my invention are clearly pointed out in the claims, and will be best understood after reference to the drawings, in which—

Figure 1:
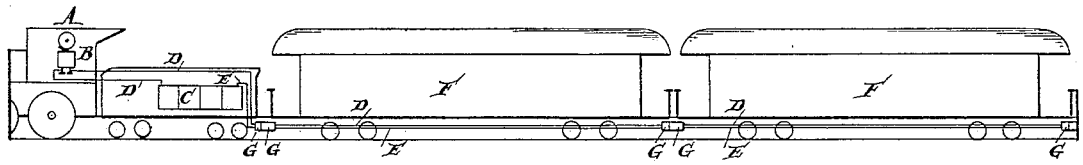
Figure 5:
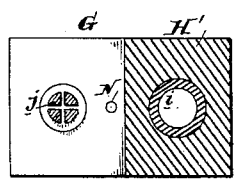
Figure 4:
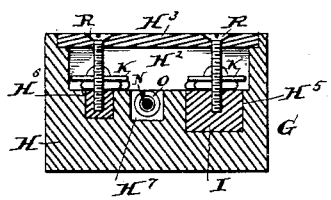
Figure 2:
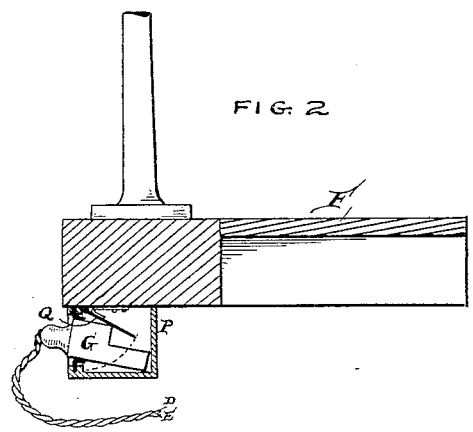
Figure 3:
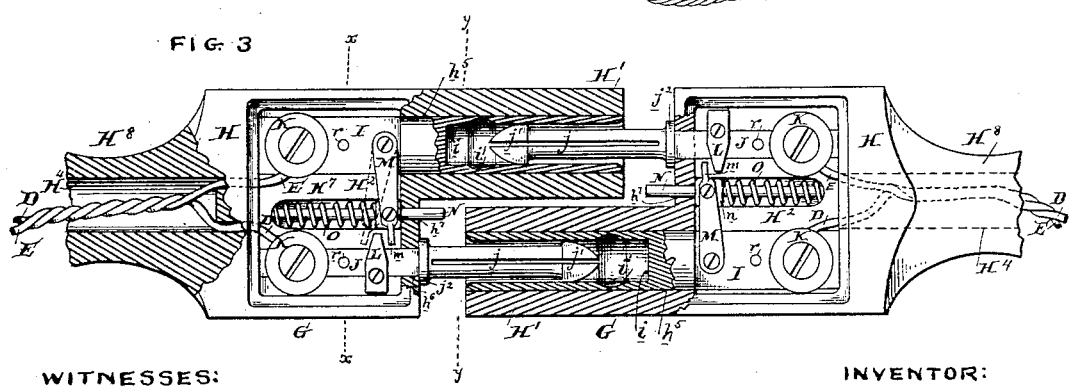

Figure 1 shows an engine and train of cars fitted with my device. Fig. 2 shows the front end of a car having my electric coupling and a box for keeping it in when not in use. Fig. 3 is a plan view of two of my couplings partly united, the interior mechanism being exposed by the removal of the covers and a partial sectioning of the couplers. Fig. 4 is a cross-section on the line $x\ x$ of Fig. 3; Fig. 5, a section on the line $y\ y$, and Fig. 6 a modification of part of my device.

A is the engine; B, an electric signaling device, here shown as a bell. C is a battery; D and E, the wires forming the electric circuit, the signal B being interposed in wire D. F F are cars.

G G are my improved couplings, here shown as situated beneath the car-floor, but capable of being applied at any part of the end of the car. These couplings are each made up of the L-shaped box H H', (preferably made of hard rubber, though any hard non-conducting substance could be used,) said box being hollowed out on one side in the broader part, H, as is shown at $H^2$, a lid, $H^3$, (see Fig. 4,) being provided to cover this hollow space. The bottom of the hollow $H^2$ is slotted, as is shown at $H^5$, $H^6$, and $H^7$, and the shank $H^8$ of the coupling is hollowed out to the hollow $H^2$, as is shown at $H^4$. The slot $H^5$ forms a continuation of an opening or hole, $h^5$, in the extended arm H' of the box. An opening, $h^6$, also extends from slot $H^6$ through the front wall of the part H.

I is a brass or other metallic conductor formed to fit in the hole $h^5$ of the arm H' and in the slot $H^5$. As shown, it is hollowed out in front, as at $i$.

J is a brass conductor having a shank fitting into the slot $H^6$. It extends out through the opening $h^6$, and its projecting end is adapted to enter and make a tight connection and contact with the tubular part $i$ of the conductor I in a similar box. This projecting part of J is preferably split, as is shown at $j$, and provided with an enlarged end, $j'$, and a shoulder, $j^2$, made to fit neatly into mouth of tube $i$, so as to exclude the entrance of dust or moisture, and an enlargement, $i'$, is preferably formed near the bottom of tube $i$ to receive the head $j'$. In the slot $H^7$ is secured a rod, N, having a shoulder, $n$, and extending out through an opening, $h^7$, in the wale of the hollow $H^2$. A light spring, O, holds this rod normally in the position shown in Fig. 3.

L is a fixed tongue of metal secured in box $H^2$, so as to be in electric contact with the conductor J; M, a metal tongue pivoted at one end so as to be in electric connection with conductor I. It is also pivoted to the block $n$, as shown, and has a projecting end adapted to touch and make electric contact with the fixed tongue L as the rod N is moved in and out.

K K are clamps, preferably of copper, by which the wires D and E are connected with the conductors J and I, respectively.

R R are screws which hold the lid $H^3$ in place. As shown, they screw into threaded holes $r\ r$ in the metal conductors J and I.

P, Fig. 2, is a box secured on the end of the car-platform and provided with an interior door or lid, Q, normally held closed by its weight or a light spring. The purpose of this is to furnish an inclosing device for the coupling G when not in use, so that it will not become wet or dirty.

It is of course obvious that electric communication is made between the wires D and E of two cars as soon as the couplings G are united, as shown in Fig. 3, and that such connection can be made with great ease and quickness. It will also be evident that the spring of the split projecting end of conductor J will cause its head $j'$ to make so tight a frictional contact with the tubular part $i$ of conductor I as to make the union of two couplers G sufficiently strong for all practical purposes, especially when the enlargement $i'$ is formed to receive the head $j'$, while they will part without breaking in case the cars themselves are uncoupled.

As shown in Fig. 3, the couplers G G are not joined to the full extent intended, and it will be seen that as they are pushed together the ends of the arms H' will come in contact with the ends of rods N and push them in, compressing spring O between the back of hollow $H^2$ and the shoulder $n$. As shoulder $n$ moves back with the rod, the pivoted tongue moves with it and its point comes in contact with the point of the fixed tongue N, thus closing the circuit formed by the wires D and E and actuating the signal B. As the couplings G G move still closer together, the pivoted tongue crosses the point of tongue N, breaking the contact, and the couplings are in their correct position, lying in the position indicated in dotted lines in Fig. 3. The shoulders $j^2$, when the couplings are fully joined, fit into the mouths of the tubes $i$ and close them, as already explained. When the couplings are separated, the spring O will force the rod N out to its normal position, thus making again a temporary connection between tongues L and M and actuating the signal, so as to notify the engineer of the separation.

Figure 6:
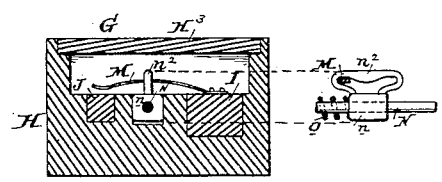

By the device shown each end of the car is provided with a right and left coupler, and any two cars can be properly united electrically. A fitting of some water-tight substance should of course be used to close the holes or passages $H^4$ after the wires D and E are inserted in it. My device is, when constructed as shown and described, practically impervious to dust and moisture. I believe that I am the first to devise means for closing the circuit in the act of coupling and uncoupling the wires, and the device above described is the one I think best adapted for this use; but I do not intend to be understood as limiting my claims to the use of this particular arrangement, except where it is specifically referred to therein, as any electrician could substitute for it substantially equivalent devices for accomplishing the same purpose, the essential feature being that the conductors I and J, or one of them, should be provided with tongues or a tongue so placed and so combined with actuating mechanism set in motion by a spring and by the joining of the couplings and by which a closing of the circuit shall be accomplished in the acts of coupling and uncoupling. Thus obviously the tongue N can be dispensed with, and the pivoted tongue M elongated, so as to cross and make contact with the conductor J directly; or, instead of pivoting the tongue M, it could be made as shown in Fig. 6, in which M is a spring secured to conductor I at one end and normally having its other end above but not in contact with conductor J.

$n^2$ is a cam secured to rod N, which, as said rod moves backward or forward, will press the spring down into contact with J and permit it to rise again, thus accomplishing the same result as in my preferred plan.

Having now described my invention, what I claim as new, and desire to secure by Letters Patent, is—

1. As an electric-circuit-coupling device, the L-shaped box H H', in combination with a conductor, I, secured in it and having an open tubular end, $i$, extending through the arm H', a conductor, J, with projecting split end and enlarged head $j'$, and clamps secured to said conductor, whereby electric wires may be secured in contact with them, all substantially as specified, and for the purpose of making a coupling with a similar coupling device.

2. As an electric-circuit-coupling device, the L-shaped box H H', in combination with a conductor, I, secured in it and having an open tubular end, $i'$, extending through the arm H', a conductor, J, with projecting split end, enlarged head $j'$, and collar $j^2$, adapted to make a neat fit in tube $i$, and clamps secured to said conductor, whereby electric wires may be secured in contact with them, all substantially as specified, and for the purpose of making a coupling with a similar coupling device.

3. As an electric-circuit-coupling device, the L-shaped box H H', in combination with a conductor, I, secured in it and having an open tubular end, $i$, extending through the arm H', a conductor, J, with projecting split end and enlarged head $j'$, a rod, N, projecting through the front end of the part H, a spring, O, connected with said rod, as specified, a tongue, M, electrically connected with one of the conductors in the box, and mechanism connecting said tongue with the rod N, whereby as said rod moves in or out said tongue is moved to make temporary contact with the second conductor, substantially as and for the purpose specified.

4. As an electric-circuit-coupling device, the L-shaped box H H', in combination with a conductor, I, secured in it and having an open tubular end, $i$, extending through the arm H', a conductor, J, with projecting split end and enlarged head $j'$, a rod, N, projecting through the front end of the part H, a spring, O, connected with said rod, as specified, and a tongue, M, in electric contact with one of the conductors in the box, said tongue being pivoted at one end to the box or conduit, pivoted also on the rod N, and having a projecting end arranged to make temporary contact with the second conductor as the rod N moves in or out, all substantially as and for the purpose specified.

5. As an electric-circuit-coupling device, the L-shaped box H H', in combination with a conductor, I, secured in it and having an open tubular end, $i$, extending through the arm H', a conductor, J, with projecting split end and enlarged head $j'$, a rod, N, projecting through the front end of the part H, a spring, O, connected with said rod, as specified, a tongue, M, in electric contact with one of the conductors in the box, said tongue being pivoted at one end to the box or conduit, pivoted also on the rod N, and having a projecting end, and a tongue, L, secured in electric contact with the second conductor and arranged so as to make temporary contact with the projecting end of pivoted tongue M as the rod N is moved in or out, all substantially as and for the purpose specified.

ALBERT C. GRIGGS.

Witnesses:
W. G. WHITELEY,
BENJ. H. B. ENNIS.